(12) United States Patent
Vicars-Harris

(10) Patent No.: US 7,612,691 B2
(45) Date of Patent: *Nov. 3, 2009

(54) ENCODING AND DECODING SYSTEMS

(75) Inventor: Nick Vicars-Harris, Carnation, WA (US)

(73) Assignee: Microsoft Corporation, Redmond, WA (US)

(*) Notice: Subject to any disclaimer, the term of this patent is extended or adjusted under 35 U.S.C. 154(b) by 331 days.

This patent is subject to a terminal disclaimer.

(21) Appl. No.: 11/677,936

(22) Filed: Feb. 22, 2007

(65) Prior Publication Data

US 2007/0136347 A1    Jun. 14, 2007

Related U.S. Application Data

(63) Continuation of application No. 10/966,773, filed on Oct. 15, 2004, now Pat. No. 7,190,285, which is a continuation of application No. 10/066,862, filed on Feb. 4, 2002, now Pat. No. 6,917,945.

(51) Int. Cl.
*H03M 7/38* (2006.01)

(52) U.S. Cl. .................................... 341/51; 382/232
(58) Field of Classification Search .............. 341/51, 341/50; 382/232, 233
See application file for complete search history.

(56) References Cited

U.S. PATENT DOCUMENTS

| 6,690,832 B1* | 2/2004 | Mitchell et al. ............. 382/233 |
| 6,941,019 B1* | 9/2005 | Mitchell et al. ............. 382/232 |
| 7,190,285 B2 | 3/2007 | Vicars-Harris |

* cited by examiner

*Primary Examiner*—Rexford N Barnie
*Assistant Examiner*—Joseph Lauture

(57) ABSTRACT

Methods and systems enable uncompressed source data, corresponding to previously-compressed data, to be manipulated or otherwise modified, prior to being rendered by a rendering application. For example, audio data can be modified to include additional audio content, and/or video data can be modified to include additional video content. Accordingly, when the modified or manipulated source data is rendered by the rendering application, it can contain additional information that was not part of the previously-compressed data.

18 Claims, 8 Drawing Sheets

ENCODING AND DECODING SYSTEMS

RELATED APPLICATION

This application is a continuation of and claims priority to U.S. patent application Ser. No. 10/966,773, filed on Oct. 15, 2004, now U.S. Pat. No. 7,190,285 and U.S. patent application Ser. No. 10/966,773 which is a continuation of and claims priority to U.S. patent application Ser. No. 10/066,862, filed on Feb. 4, 2002, now U.S. Pat. No. 6,917,945 the disclosures of which are incorporated by reference herein.

TECHNICAL FIELD

This invention relates to encoding and decoding methods and systems.

BACKGROUND

Large files such as media files (e.g. audio, video, audio/video files and the like), are typically compressed for ease of storage and/or transmission. For example, the proliferation of the Internet as a communication medium has enabled users to access and play many different types of media files. Typically, these files are quite large and, as a result, are compressed so that they can be adequately transmitted over a network without consuming too much network bandwidth. On the client end, such files are typically received, stored and/or rendered by a media player. The rendering process typically involves uncompressing the compressed bits of the media file and then rendering the uncompressed bits on a suitable media player.

Many times, it would be desirable to impart, to a compressed file, such as a media file, other useful features in addition to the information that the file contains. For example, advertisers would benefit by being able to associate advertising information with particular media files such as video files. Additionally, it would be desirable to be able, in some instances, to do "voice overs" on certain audio files. Currently, however, there is no simple known way to do this in a straight forward, easily implemented manner.

Accordingly, this invention arose out of concerns associated with providing methods and systems for manipulating compressed files.

SUMMARY

Methods and systems enable uncompressed source data, corresponding to previously-compressed data, to be manipulated or otherwise modified, prior to being rendered by a rendering application. For example, audio data can be modified to include additional audio content, and/or video data can be modified to include additional video content. Accordingly, when the modified or manipulated source data is rendered by the rendering application, it can contain additional information that was not part of the previously-compressed data.

DETAILED DESCRIPTION

Overview

The methods and systems described below enable uncompressed source data, corresponding to previously-compressed data, to be manipulated or otherwise modified, prior to being rendered by a rendering application. For example, audio data can be modified to include additional audio content, and/or video data can be modified to include additional video content. Accordingly, when the modified or manipulated source data is rendered by the rendering application, it can contain additional information that was not part of the previously-compressed data. The methods and systems can be employed in a wide variety of different areas such as advertising and content protection to name just a few.

Exemplary Computer Environment

Figure 1:
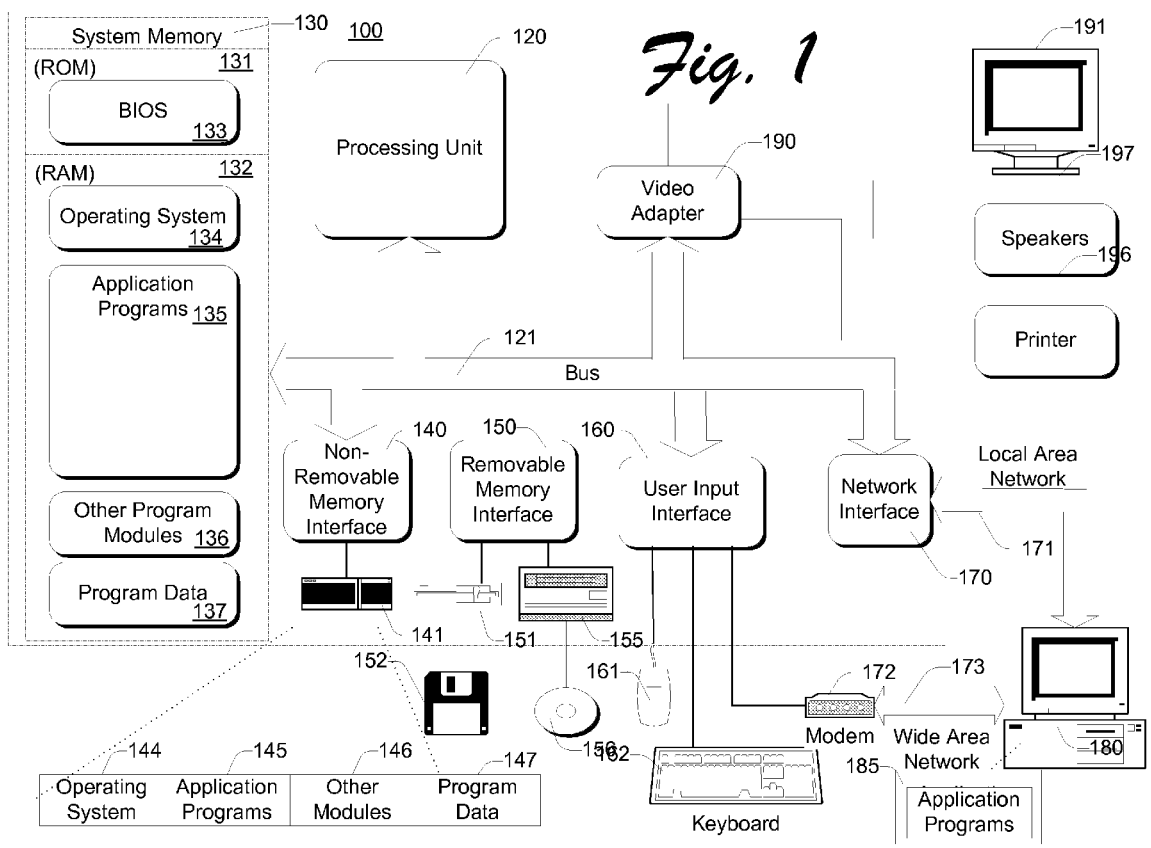
FIG. 1 is a block diagram of an exemplary computer system that can be utilized to implement one or more embodiments.

The various components and functionality described herein can be implemented in connection with a number of different types of individual computers. FIG. 1 shows components of typical example of such a computer, referred to by reference numeral 100. The components shown in FIG. 1 are only examples, and are not intended to suggest any limitation as to the scope of the claimed subject matter; the claimed subject matter is not necessarily dependent on the features shown in FIG. 1.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The invention described herein includes these and other various types of computer-readable media when such media contain instructions programs, and/or modules for implementing the steps described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 1, the components of computer 100 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Computer 100 typically includes a variety of computer-readable media. Computer-readable media can be any available media that can be accessed by computer 100 and includes both volatile and nonvolatile media, removable and non-removable media. By way of example, and not limitation, computer-readable media may comprise computer storage media and communication media. "Computer storage media" includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer-readable instructions, data structures, program modules or other data in a modulated data signal such as a carrier wave or other transport mechanism and includes any information delivery media. The term "modulated data signal" means a signal that has one or more if its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 100, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 100 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface such as interface 150.

The drives and their associated computer storage media discussed above and illustrated in FIG. 1 provide storage of computer-readable instructions, data structures, program modules, and other data for computer 100. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 100 through input devices such as a keyboard 162 and pointing device 161, commonly referred to as a mouse, trackball, or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port, or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer may operate in a networked environment using logical connections to one or more remote computers, such as a remote computer 180. The remote computer 180 may be a personal computer, a server, a router, a network PC, a peer device or other common network node, and typically includes many or all of the elements described above relative to computer 100. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 100 is connected to the LAN 171 through a network interface or adapter 170. When used in a WAN networking environment, the computer 100 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 100, or portions thereof, may be stored in the remote memory storage device. By way of example, and not limitation, FIG. 1 illustrates remote application programs 185 as residing on computer 180. It will be appreciated that the network connections shown are exemplary and other means of establishing a communications link between the computers may be used.

Exemplary Encoding/Decoding Process

Figure 2:
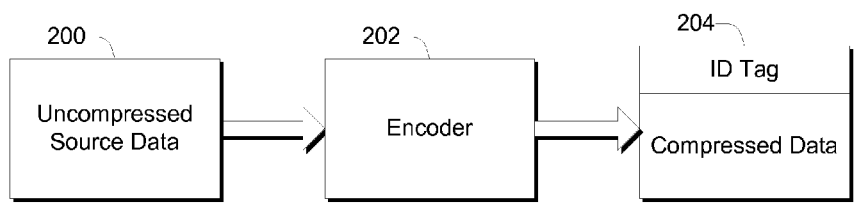
FIG. 2 is a block diagram that describes an encoding process.

FIG. 2 illustrates an example of how data is compressed to provide a compressed file. Typically, an uncompressed file contains uncompressed source data 200. This data can be any type of data that is desirable to compress. For example, audio data and/or video data that is to be rendered by a typical media player can be compressed for purposes of transmission and/or storage. In order to compress the source data 200, an encoder 202 is typically used. An encoder typically comprises a software application that executes one or more compression algorithms that are used to compress the source data. There are many different types of compression algorithms that can be used, as will be appreciated by those of skill in the art. The output of encoder 202 is typically a file, such as file 204, that contains the compressed bits of the source data. In addition, file 204 usually contains an ID tag that is associated with and identifies the particular type of encoder that was used to compress the source data. The ID tag is useful for purposes of accurately uncompressing the compressed bits. That is, the ID tag identifies the encoder so that the correct decoder can be loaded and used to uncompress the compressed bits.

Figure 3:
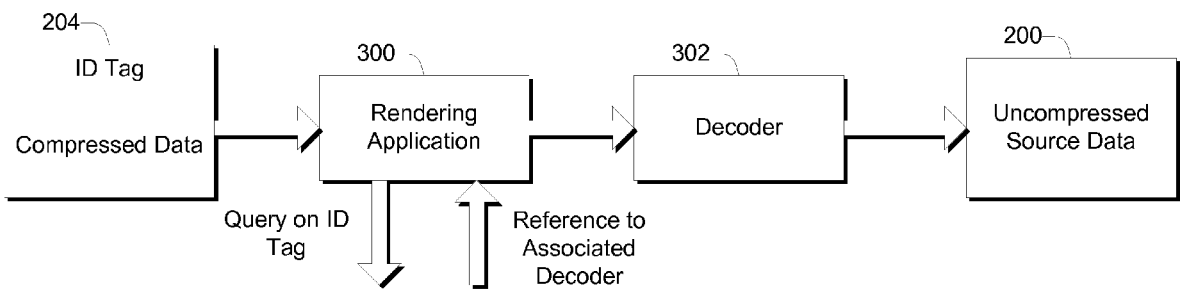
FIG. 3 is a block diagram that describes a decoding process.

As an example, consider FIG. 3 which illustrates what typically happens when a rendering application, such as a media player, attempts to play a compressed file. Assume that a user, executing a rendering application 300 (or media player), clicks on a particular media file in their media file directory. In this case, the user has clicked on an icon associated with file 204. The rendering application 300 retrieves the file and searches for the ID tag associated with the file. The ID tag can simply comprise a long string of characters. Once the rendering application 300 finds the ID tag, it can query the operating system, using the ID tag, to ascertain which decoder is associated with the identified encoder. The operating system typically returns a reference to the rendering application which can then take steps to load the associated decoder (in this case decoder 302) and provide the compressed data to the decoder for decompression. The output of the decoder is the uncompressed source data 200 which can then be provided to the rendering application 300 for rendering.

Exemplary Embodiment

In accordance with one embodiment, a file containing compressed data is processed in such a way as to associate it with a decoder that does not correspond to the encoder that originally compressed the file's source data. The file is then processed by the decoder in such a way as to uncompress the compressed data, manipulate or modify the uncompressed data in some desirable way, and then provide the manipulated or modified data to a rendering application for rendering.

One exemplary way that this can be done is as follows. The ID tag that is typically associated with the compressed data and which identifies the encoder that was used to compress the source data is replaced with a new ID tag. The new ID tag is not associated with the encoder that was used to compress the source data (and hence the associated decoder that can be used to uncompress the compressed data). Rather, the new ID tag is associated with a different decoder that, in a sense, acts as a middle man so that the compressed data can be uncompressed and then modified in some way and subsequently provided to the rendering application for rendering.

Figure 4:
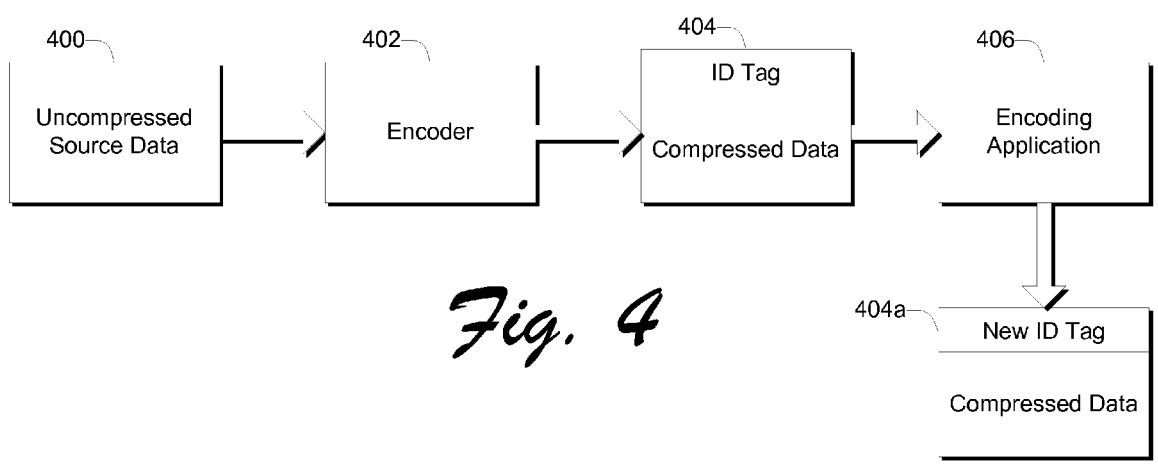
FIG. 4 is a block diagram that describes an encoding process in accordance with one embodiment.

Consider, for example, FIG. 4. There, uncompressed source data 400 is compressed by an encoder 402 in the usual way. Recall that part of the compression processing includes providing compressed data that is associated with the uncompressed source data, as well as an ID tag that is associated with the encoder 402. Such can typically be provided in the form of a file 404. In this particular embodiment, an encoding application 406 receives file 404 and searches the file for the ID tag that is associated with the encoder 402. When the encoding application 406 finds that ID tag, it essentially changes the ID tag to a new ID tag and leaves the compressed data as is to provide a file 404a.

Figure 5:
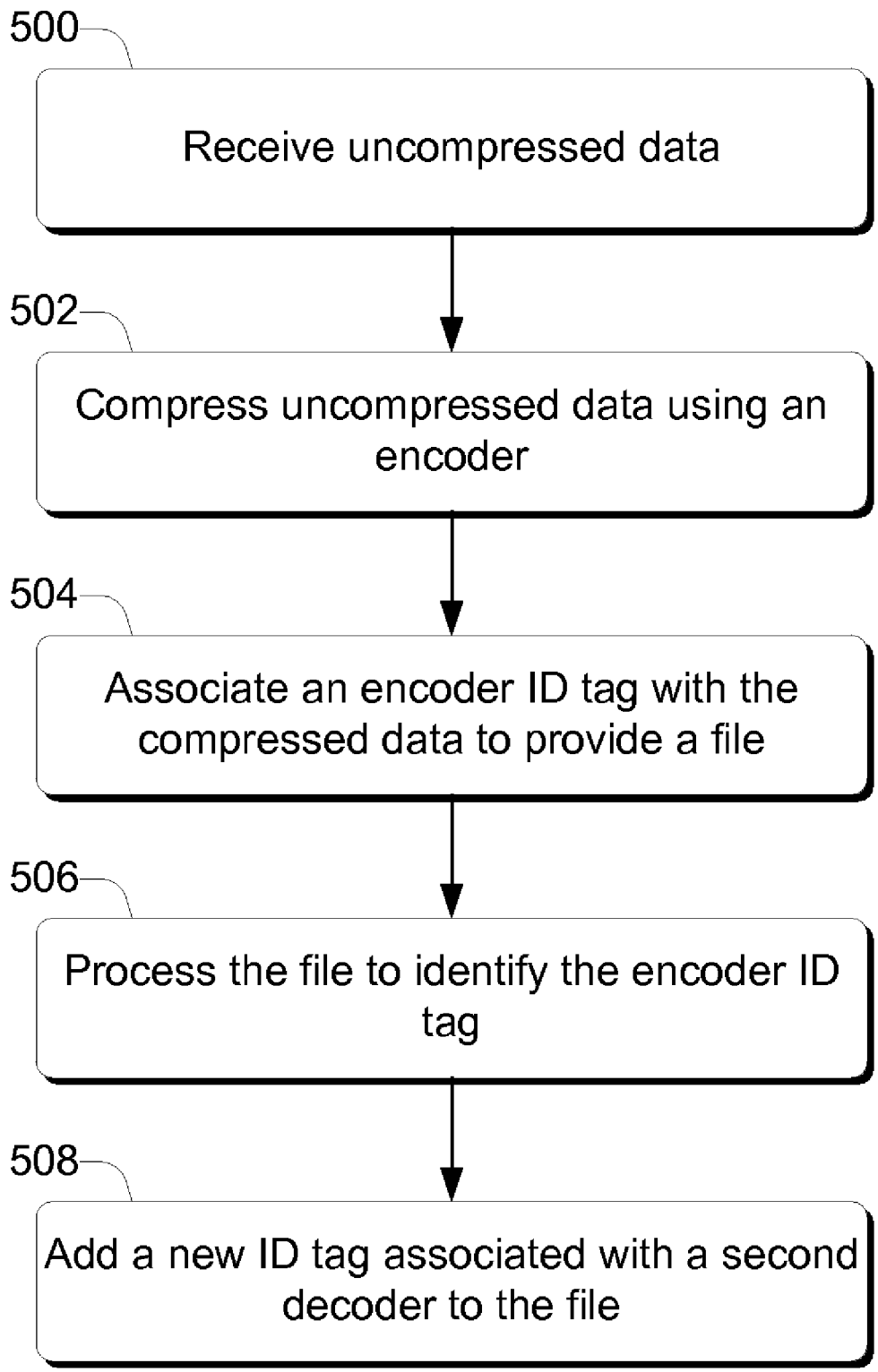
FIG. 5 is a flow diagram that describes steps in a method in accordance with one embodiment.

FIG. 5 is a flow diagram that describes steps in a method in accordance with one embodiment. The method can be implemented in any suitable hardware, software, firmware or combination thereof. In the illustrated and described embodiment, the method is implemented in software.

Step 500 receives uncompressed data. This data can be any type of data that is desirable to compress. For example, such data can comprise audio data, video data, audio/video data and the like. Step 502 compresses the uncompressed data using an encoder. Any suitable encoder or encoding application can be used. Step 504 associates an encoder ID tag with the compressed data to provide a file. The ID tag can be used to later identify the encoder when decoding is desired. Step 506 processes the file to identify the encoder ID tag. This step can be implemented by an encoding application such as application 406 (FIG. 4). Step 508 adds a new ID tag to the file. The new ID tag is associated with a second decoder which is different from the decoder that is associated with the encoding encoder.

The second decoder enables the file to be uncompressed and then manipulated or modified in some way so that when the uncompressed source data is rendered by a rendering application, it is rendered in a different way.

New or Second Decoder

On the client end, a new or second decoder is provided and registered with the operating system. This second decoder is associated with the new ID tag so that when the client attempts to render the file, the new decoder is used in the decoding process. As an example, consider FIG. 6.

There, a rendering application 600 is engaged by the user in an attempt to render or otherwise play file 404a. In the usual manner, the rendering application 600 retrieves or otherwise receives file 404a and searches for the file's ID Tag. Instead of finding the original ID Tag that is associated with the encoding encoder (e.g. encoder 402 (FIG. 4)), the rendering application locates the New ID Tag and performs a query on the New ID Tag. When the query is executed, instead of returning a reference for the decoder associated with the encoding encoder, the query returns a reference that can be used to load a new decoder 602. The new decoder 602 functions to enable the compressed file to be uncompressed so that the uncompressed source data can be manipulated in some way.

Figure 7:
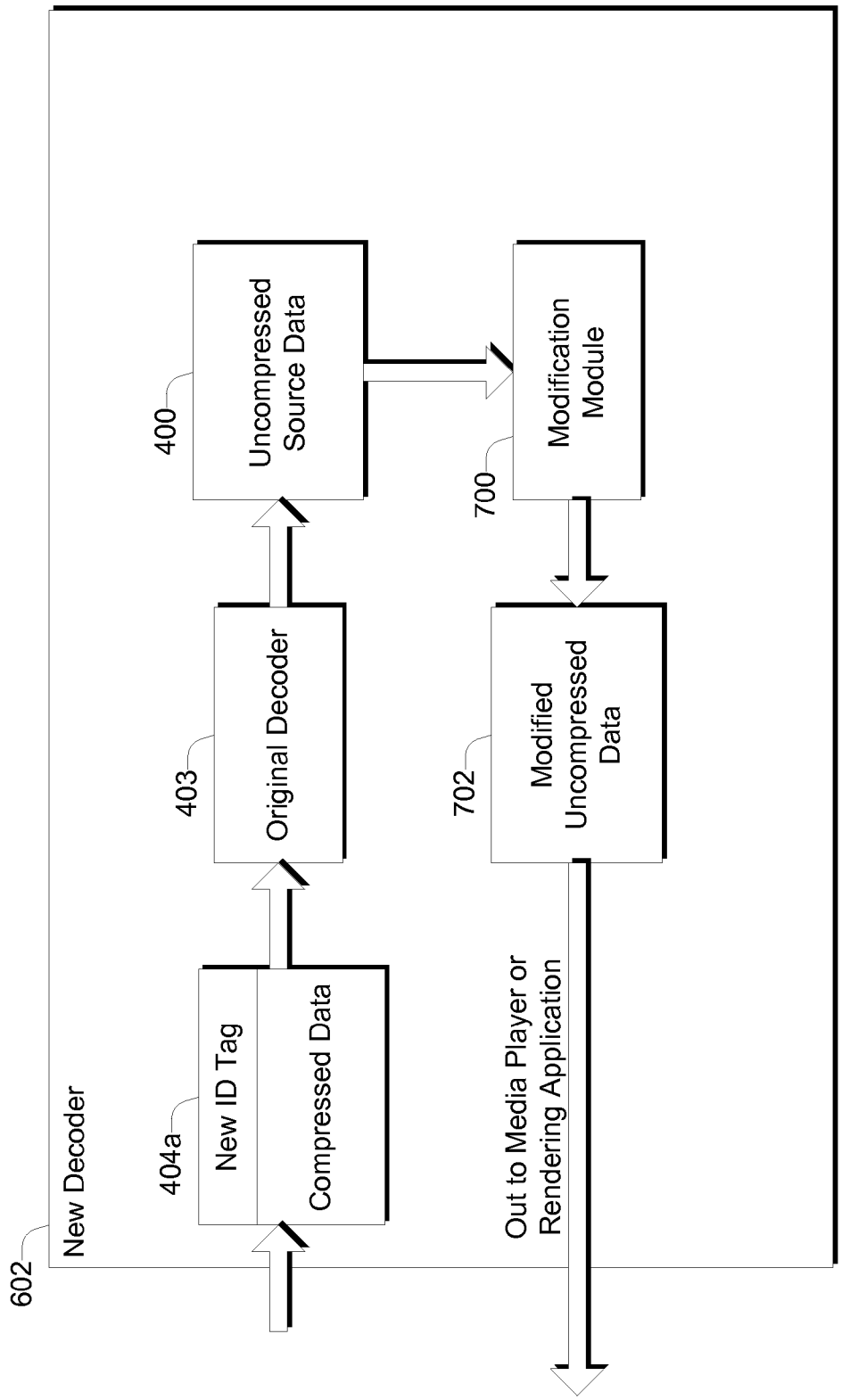
FIG. 7 is a block diagram that describes an exemplary decoder in accordance with one embodiment.

FIG. 7 shows but one example of new decoder 602 and the processing that takes place using the new decoder. Here, decoder 602 receives file 404a which may or may not contain the New ID Tag. In this example, decoder 602 is a "wrapper" around an original decoder 403 that is associated with the encoding encoder (i.e. encoder 402). New decoder 602 provides the compressed data of file 404a to the original decoder 403 so that the original decoder can uncompress the compressed data to provide uncompressed source data 400. Next, a modification module 700 receives the uncompressed source data or otherwise operates on the uncompressed source data to provide modified uncompressed data 702. It should be appreciated and understood that although modification module 700 is illustrated as comprising part of the new decoder 602, such need not necessarily be the case. For example, the modification module can comprise a separate software component that is called by the new decoder 602 to modify the uncompressed source data. If this is the case, then once the modification module modifies the source data, it can call the new decoder 602 and provide the modified uncompressed data 702 back to the new decoder. This modified data can now be provided to a media player or rendering application for rendering.

The modification module 700 can perform a wide variety of modifications to the source data. For example, the modification module can add data to the source data, remove data from the source data, or manipulate the source data. Consider, for example, a media file comprising video data. The modification module can process the source data to provide an advertisement that can overlay a portion of the source data when it is ultimately rendered. For audio data, the modification module can add data that can be used, for example, as a "voice over". The modification module can also be used to translate source data from one language to another. Consider, for example, textual data that is written in English. Assume that a French content provider desires to provide the textual data in French so that its French clients can enjoy the data as well. In this example, the French content provider can provide a new decoder 602 and a modification module 700 that serves to translate the textual data into French. Other uses of the modification module can include processing the bits of the source data using digital signal processing (DSP) techniques to modify the way in which the source data is to be rendered. In addition, the modification module can be used for implementing digital security techniques. For example, content providers may desire to insert watermarks or other identifying features into the source data that they provide. By having a properly configured modification module, security measures can be provided to protect the provider's content.

Needless to say, there are simply a multitude of applications for the modification module. By providing a new decoder 602 that is a wrapper for the original decoder, a high degree of flexibility can be provided for those who desire to modify source data.

Figure 8:
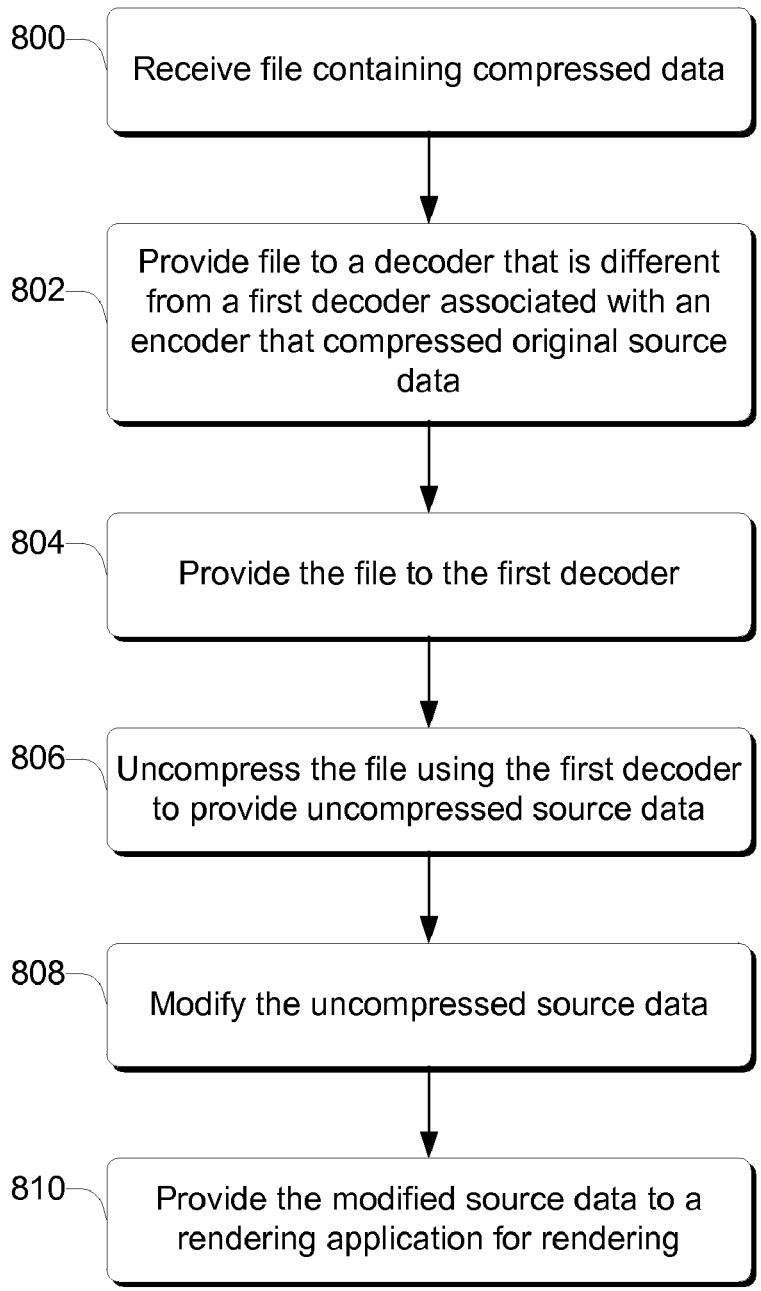
FIG. 8 is a flow diagram that describes steps in a method in accordance with one embodiment.

FIG. 8 is a flow diagram that describes steps in a method in accordance with one embodiment. The method can be implemented in any suitable hardware, software, firmware or combination thereof. In the illustrated and described embodiment, the method is implemented in software.

Figure 6:
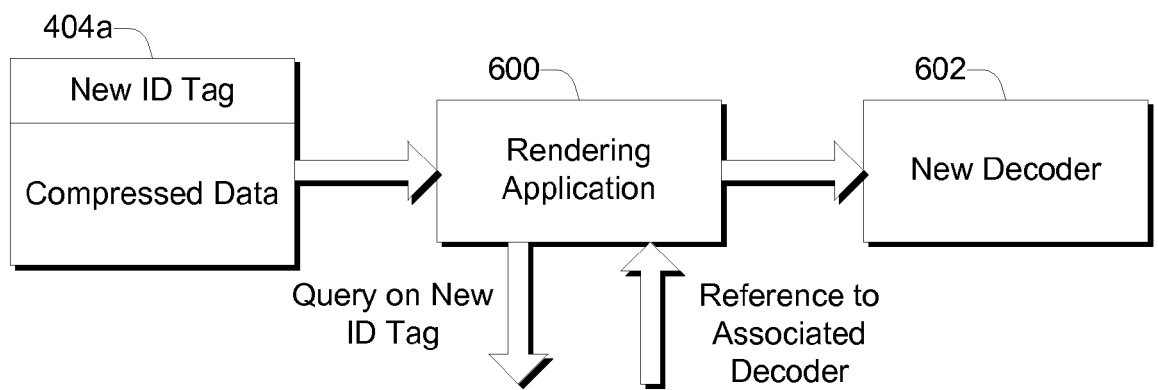
FIG. 6 is a block diagram that describes a decoding process in accordance with one embodiment.

Step 800 receives a file containing compressed data. An exemplary file 404*a* is shown in FIG. 6. Step 802 provides the file to a decoder that is different from a first decoder that is associated with an encoder that compressed original source data of the file. In the FIG. 7 example, the file is provided to a new decoder 602. Step 804 then provides the file to the first decoder (e.g. in the FIG. 7 example, the first decoder is represented by original decoder 403). Thus, in this example, the new decoder acts as a wrapper for the original decoder. Step 806 uncompresses the file using the first decoder to provide uncompressed source data. Step 808 then modifies the uncompressed data. Examples of various types of modifications are provided above. Step 810 then provides the modified source data to a rendering application for rendering.

Example Using Audio/Video Data

Figure 9:
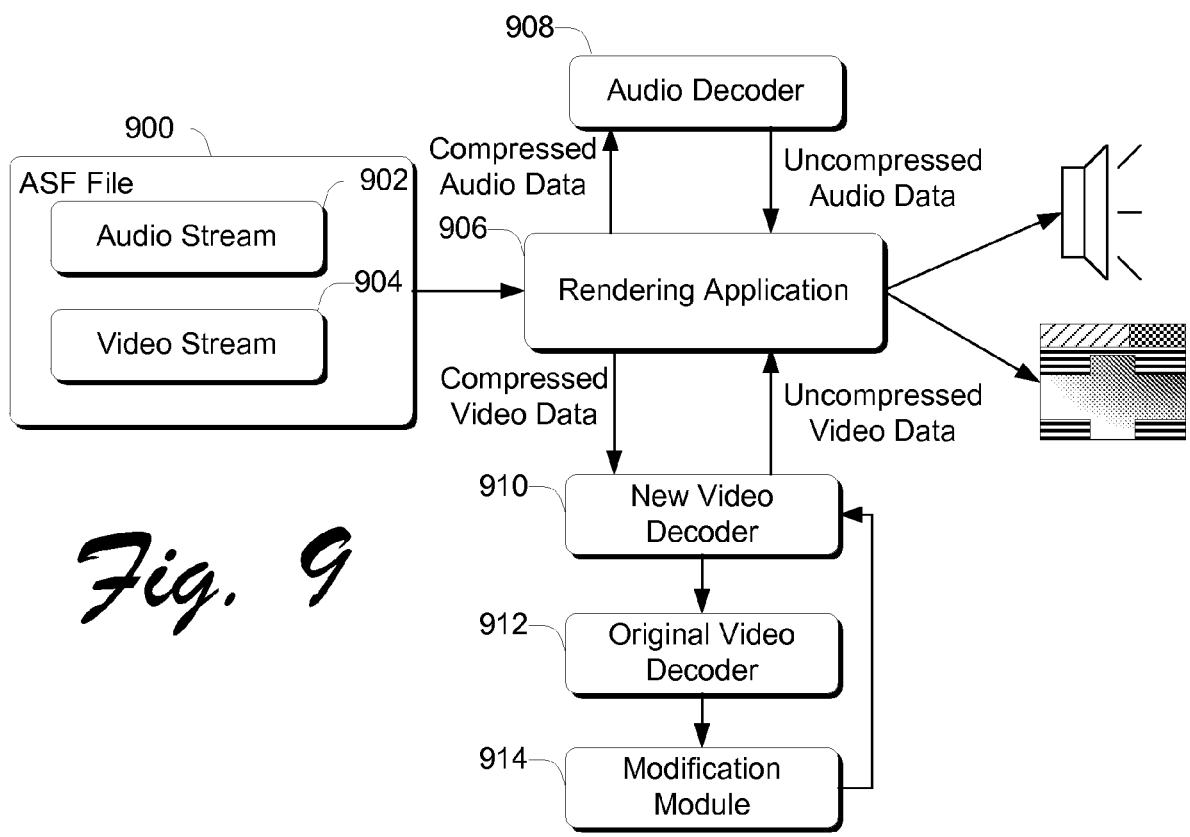
FIG. 9 is a block diagram that provides one example in accordance with one specific embodiment.

FIG. 9 shows an example in which a compressed file contains both audio and video data. In this example, an ASF file 900 comprises a compressed audio stream 902 and a compressed video stream 904. Typically, audio and video data are compressed using different encoders. Hence, when the audio and video data are to be uncompressed, each typically uses a different decoder.

In this example, assume that a content provider has opted to modify the video data and not the audio data. Perhaps the content provider has opted to add an advertisement to the video data. Assume now that a user on a client device is executing a rendering application 906 and selects the ASF file 900 for rendering. The rendering application processes the ASF file 900 and identifies an audio decoder 908 that is to be used to uncompress the audio stream 902. Accordingly, the rendering application 906 hands the compressed audio data to the audio decoder 908 and receives back the uncompressed audio data. This audio data can now be rendered by the rendering application (as indicated by the speaker appearing to the right of the rendering application).

The rendering application 906 also identifies a new video decoder 910 that is to be used to uncompress the video stream 904. Recall that one way of doing this is to provide a new ID tag with the video stream 904 that corresponds to the new video decoder 910. Accordingly, rendering application 906 hands the compressed video data to the new video decoder 910 which, in turn, hands the compressed video data to the original video decoder 912. The original video decoder 912 uncompresses the compressed video data and provides the uncompressed source data to modification module 914 which then operates on the uncompressed source data to, for example, insert an advertisement into the source data. The modification module 914 then provides the modified source data so that the new video decoder 910 can return the modified source data to the rendering application 906 for rendering, as indicated by the graphics directly below the illustrated speaker.

CONCLUSION

The described methods and systems facilitate flexibility insofar as enabling uncompressed source data, corresponding to previously-compressed data, to be manipulated or otherwise modified, prior to being rendered by a rendering application. Accordingly, when the modified or manipulated source data is rendered, it can contain additional information that was not previously part of the previously-compressed data.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computing system comprising:
   one or more computer-readable media;
   one or more processors;
   computer-readable instructions on the one or more computer-readable which, when executed by the one or more processors, cause the one or more processors to execute a method comprising:
      receiving compressed data that has been compressed using a first encoder having an associated first decoder that can be used to uncompress the compressed data;
      providing the compressed data to at least one second decoder that is different from the first decoder, wherein the at least one second decoder comprises a wrapper for the first decoder;
      uncompressing the compressed data to provide uncompressed data by providing the compressed data to the wrapped first decoder; and
      operating on the uncompressed data to provide modified uncompressed data.

2. The computing system of claim 1, wherein the instructions further cause the one or more processors to render the modified uncompressed data using a rendering application.

3. The computing system of claim 1, wherein said providing the compressed data to the second decoder comprises searching for an ID tag associated with the compressed data and which corresponds to the second decoder.

4. The computing system of claim 1, wherein said uncompressing comprises providing the compressed data to the wrapped first decoder so that the wrapped first decoder can uncompress the compressed data, and further wherein the instructions cause the one or more processors to provide the modified uncompressed data to the second decoder so that the second decoder can provide the modified uncompressed data to a rendering application for rendering.

5. The computing system of claim 1, wherein the compressed data comprises audio data.

6. The computing system of claim 1, wherein the compressed data comprises video data.

7. The computing system of claim 1, wherein the compressed data comprises both audio data and video data.

8. A computing system comprising;
   one or more computer-readable media;
   one or more processors;
   computer-readable instructions on the one or more computer-readable which, when executed by the one or more processors, cause the one or more processors to execute a method comprising:
      receiving a compressed file that has been compressed using a first encoder having an associated first decoder that can be used to uncompress the compressed file, the compressed file comprising at least one ID tag that is associated with a second decoder that is different from the first decoder and that serves as a wrapper for the first decoder;
      searching for said at least one ID tag to identify the second decoder;
      providing the compressed file to the second decoder so that the compressed file can be uncompressed;
      using the second decoder, providing the compressed file to the first decoder;
      uncompressing the compressed file using the first decoder to provide an uncompressed file;
      providing the uncompressed file to a modification module;
      modifying the uncompressed file using the modification module to provide a modified uncompressed file;
      providing the modified uncompressed file to the second decoder;
      using the second decoder, providing the modified uncompressed file to a rendering application; and
      rendering the modified uncompressed file on a client device using the rendering application.

9. The computing system of claim 8, wherein said searching is performed by the rendering application.

10. The computing system of claim 8, wherein said compressed file comprises compressed audio data.

11. The computing system of claim 8, wherein said compressed file comprises compressed video data.

12. The computing system of claim 8, wherein said compressed file comprises both compressed audio data and compressed video data.

13. The computing system of claim 8, wherein said compressed file comprises a compressed media file.

14. A computing system comprising:
   one or more computer-readable media;
   one or more processors;
   computer-readable instructions on the one or more computer-readable which, when executed by the one or more processors, cause the one or more processors to execute a method comprising:
      receiving a file comprising compressed data and information associated with an encoder that compressed source data corresponding to the compressed data, said information being configured for use in locating a first decoder that corresponds to the encoder and which can be used to uncompress the compressed data;
      searching for the information;
      replacing the information with different information that is associated with a second decoder that is different from the first decoder and which can be used, at least in part, to uncompress the compressed data, wherein the second decoder comprises a wrapper for the first decoder.

15. The computing system of claim 14, wherein both said information and said different information comprise respective ID tags.

16. The computing system of claim 14, wherein said compressed data comprises audio data.

17. The computing system of claim 14, wherein said compressed data comprises video data.

18. The computing system of claim 14, wherein said compressed data comprises both audio data and video data.

* * * * *